United States Patent [19]

McCombs et al.

[11] 4,263,018
[45] Apr. 21, 1981

[54] PRESSURE SWING ADSORPTION PROCESS AND SYSTEM FOR GAS SEPARATION

[75] Inventors: Norman R. McCombs, Tonawanda; Edward E. Vrana, West Seneca, both of N.Y.

[73] Assignee: Greene & Kellogg, Tonawanda, N.Y.

[21] Appl. No.: 63,628

[22] Filed: Aug. 3, 1979

Related U.S. Application Data

[63] Continuation of Ser. No. 874,167, Feb. 1, 1978, Pat. No. 4,194,890, which is a continuation of Ser. No. 745,285, Nov. 26, 1976, abandoned.

[51] Int. Cl.³ .............................................. B01D 53/04
[52] U.S. Cl. .......................................... 55/18; 55/25; 55/68; 55/75; 55/163; 55/179; 55/389
[58] Field of Search ................... 55/18, 25, 26, 33, 62, 55/74, 75, 163, 179, 180, 387, 389, 68

[56] References Cited

U.S. PATENT DOCUMENTS

| | | | |
|---|---|---|---|
| 2,955,673 | 10/1960 | Kennedy et al. | 55/33 X |
| 3,138,439 | 6/1964 | Skarstrom | 55/75 X |
| 3,142,547 | 7/1964 | Marsh et al. | 55/26 |
| 3,176,444 | 4/1965 | Kiyonaga | 55/26 |
| 3,242,650 | 3/1966 | Crawford | 55/163 |
| 3,252,268 | 5/1966 | Stark | 55/25 |
| 3,338,030 | 8/1967 | Feldbauer, Jr. | 55/25 |
| 3,636,679 | 1/1972 | Batta | 55/26 |
| 3,659,399 | 5/1972 | Kauer, Jr. et al. | 55/62 X |
| 3,738,087 | 6/1973 | McCombs | 55/62 X |
| 3,788,036 | 1/1974 | Lee et al. | 55/25 |
| 3,796,022 | 3/1974 | Simonet et al. | 55/25 |
| 3,797,201 | 3/1974 | Tamura | 55/62 |
| 3,891,411 | 6/1975 | Meyer | 55/26 |
| 3,923,477 | 12/1975 | Armond et al. | 55/25 |
| 3,977,845 | 8/1976 | Walter | 55/25 |
| 4,021,210 | 5/1977 | Streich et al. | 55/26 |
| 4,194,890 | 3/1980 | McCombs et al. | 55/18 |

*Primary Examiner*—Robert H. Spitzer
*Attorney, Agent, or Firm*—William Kovensky

[57] ABSTRACT

A pressure swing adsorption process and system including at least two adsorption beds and a segregated storage adsorption bed which is isolated from direct communication with the feed gas stream. During the process the pressures in the adsorption beds are equalized from the feed ends thereof at the end of adsorption in one of the beds and after pressurization of the other bed. The segregated storage adsorption bed is pressure equalized with a depressurizing adsorption bed and then after purging of the bed the segregated storage adsorption bed is equalized with that adsorption bed during repressurizing thereof. A pair of flow control valves are connected in a gas flow path connected to the outlets of the adsorption beds, each valve being located adjacent a corresponding one of the beds and allowing unrestricted flow away from the corresponding bed and controlled flow toward that bed. A reservoir connected to the system output conduit stores product gas for use during a system malfunction or for augmenting system function.

19 Claims, 4 Drawing Figures

PRESSURE SWING ADSORPTION PROCESS AND SYSTEM FOR GAS SEPARATION

This is a continuation of application Ser. No. 874,167, filed Feb. 1, 1978 and now U.S. Pat. No. 4,194,890, which was a continuation of application Ser. No. 745,285 filed on Nov. 26, 1976 and now abandoned.

BACKGROUND OF THE INVENTION

This invention relates to the art of separation of gas mixtures, and more particularly to a new and improved process and system for separating gas mixtures by pressure swing adsorption.

One area of use of the present invention is in separating air to provide a product stream of high purity oxygen, although the principles of the present invention can be variously applied. In basic pressure swing adsorption processes and systems for separating air, adsorption is carried out at a high pressure and desorption is carried out at a low pressure. Compressed air is introduced into a fixed bed of adsorbent material and nitrogen is then preferentially adsorbed to produce oxygen rich gas product. When the adsorption bed is about saturated, the bed pressure is reduced to desorb nitrogen from the adsorbent material and regenerate the adsorption capacity. To increase the efficiency of regeneration, a purge by some of the product or an intermediate process stream often is used. To facilitate continuous operation, two or more adsorption beds are employed so that while one bed performs adsorption the other bed undergoes regeneration.

In the design and operation of pressure swing adsorption processes and systems, it would be highly desirable to provide maximum utilization of adsorbent material in the adsorption beds, reduction in energy requirements for operation of the system, a substantially constant degree of product purity, and reduction in adsorbent material requirements while maintaining a high degree of product purity, along with improved efficiency and reliability.

SUMMARY OF THE INVENTION

It is, therefore, a primary object of this invention to provide a new and improved process and system for separation and fractionation of gas mixtures by pressure swing adsorption.

It is a further object of this invention to provide such a process and system characterized by maximum utilization of adsorbent material in the adsorption beds.

It is a further object of this invention to provide such a process and system having reduced energy requirements for operation.

It is a further object of this invention to provide such a process and system which is balanced and yields a substantially constant degree of product purity.

It is a further object of this invention to provide such a process and system which has reduced adsorbent material requirements along with a high degree of product purity.

It is a further object of this invention to provide such a process and system which maintains a reserve supply of product for use during a system malfunction or in augmenting system functions.

It is a further object of this invention to provide such a process and system which is reliable, efficient and economical.

The present invention provides a pressure swing process and system for fractionating at least one component from a gaseous mixture by selective adsorption in each of at least two adsorption beds the gas inlets of which are selectively connected to a feed gas stream and the gas outlets of which are coupled by output conduit means to a gas product outlet. A segregated storage adsorption bed is connected at one end selectively to the outlets of the adsorption beds and is isolated from direct communication with the feed gas stream. The pressures in the adsorption beds are equalized from the feed ends thereof at the end of adsorption in one of the beds and after pressurization of the other bed. The one adsorption bed and the segregated storage adsorption bed are equalized in pressure from the outlet end of the one bed while product is withdrawn from the outlet of the other bed. The one adsorption bed then is depressurized and purged while product is withdrawn from the other bed. The segregated storage adsorption bed and the one adsorption bed are equalized in pressure through the outlet end of the one bed. The foregoing steps are repeated consecutively reversing the functions of the two beds. A pair of flow control valves are connected in a gas flow path connected to the outlets of the two adsorption beds, each valve being located adjacent a corresponding one of the beds and allowing unrestricted flow away from the corresponding bed and controlled flow toward that bed. A reservoir connected to the output conduit means stores product gas which can be supplied to the product outlet during a malfunction or to the adsorption beds for augmenting system functions.

The foregoing and additional advantages and characterizing features of the present invention will become clearly apparent from the ensuing detailed description wherein:

BRIEF DESCRIPTION OF THE DRAWING FIGURES

DETAILED DESCRIPTION OF THE ILLUSTRATED EMBODIMENTS

Figure 1:
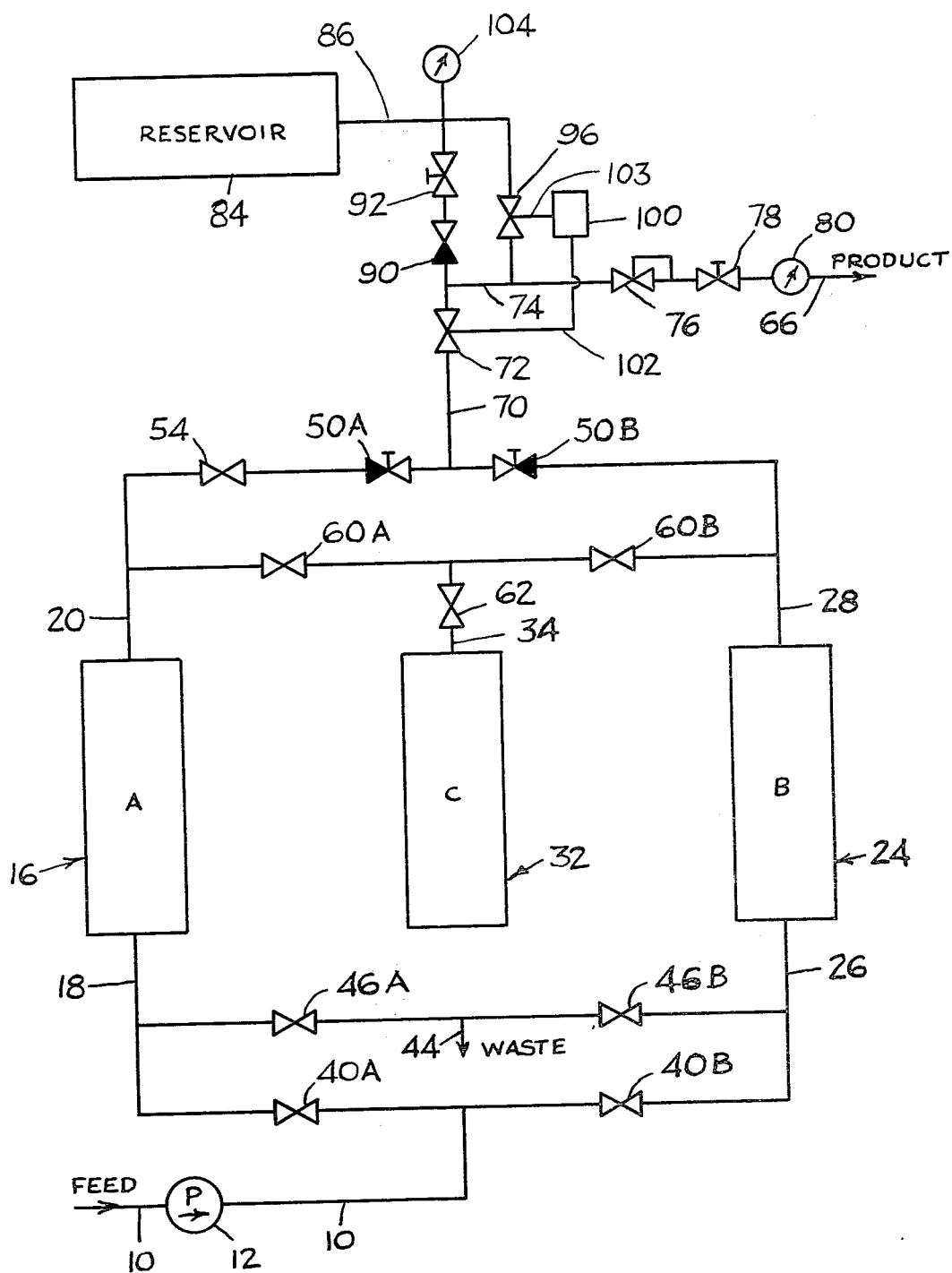
FIG. 1 is a schematic diagram of a pressure swing adsorption system according to the present invention.

Referring now to FIG. 1, there is shown a system according to the present invention for fractionating at least one component from a gaseous mixture by pressure swing adsorption. The gaseous mixture is supplied to the system by a feed gas stream which flows along an input conduit 10 and is moved therealong by means of a pump or compressor 12. Although the present system and process is specifically described and illustrated in relation to the application of pressure swing adsorption to the fractionation of air to produce an oxygen rich stream, the present invention is broadly applicable to the separation of organic and/or inorganic gas mixtures.

The system includes a first adsorption bed 16, also designated A, having a gas inlet 18 and a gas outlet 20. The system further includes at least one additional adsorption bed 24, also designated B, having a gas inlet 26 and a gas outlet 28. Adsorption beds A and B are the type comprising a vessel containing adsorbent material and are well known to those skilled in the art. A preferred vessel construction includes an outer pressure cell with an inner annulus, and one skilled in the art can provide suitable pressure vessels, piping or tubing, connectors, valves and auxiliary devices and elements. Likewise, adsorbent materials are well-known in the art, and one skilled in the art may select an adsorbent material(s) which is commercially recommended for the separation or fractionation of the particular gas to be purified. Examples of typical adsorbent materials for use in adsorption beds include natural or synthetic zeolites, silica gel, alumina and the like. Generally, the adsorbent beds in a system contain the same adsorbent material, however, each bed may contain a different type of adsorbent material or different mixtures of adsorbent material as desired. The particular adsorbent material or mixtures used are not critical in the practice of this invention as long as the material separates or fractionates the desired gas components.

The system of the present invention further comprises a segregated storage adsorption bed 32, also designated C, and in the system shown in FIG. 1 gas is introduced to and withdrawn from the segregated storage adsorption bed C at the same end which is provided with a conduit 34. The segregated storage adsorption bed C likewise is a vessel containing adsorbent material, but bed C does not communicate with the feed gas stream from conduit 10. In the system shown, adsorption bed C is approximately the same size as the adsorption beds A and B and may contain the same type of adsorbent material, but the segregated storage adsorption bed C can be smaller in size, include different adsorbent material, and be operated at a different capacity as compared to the adsorption beds A and B.

The gas inlet 18 of adsorption bed A is connected to conduit 10 containing the feed gas stream by suitable conduit means including an automatic valve 40A and, similarly, the gas inlet 26 of adsorption bed B is connected to the feed gas stream in conduit 10 by suitable conduit means including an automatic valve 40B. The system further includes a waste gas outlet 44 which can be open to the atmosphere or which can be in fluid communication with a waste gas stream. The gas inlets 18 and 26 of adsorption beds A and B, respectively, also are connected to the waste gas outlet 44 by suitable corresponding conduit means including automatic valves 46A and 46B, respectively. The automatic valves 40 and 46 and those additional automatic valves to be described can be of the solenoid-operated type, but in any event are of the type which are operated to be either fully open or fully closed.

The system of the present invention further comprises means such as suitable conduits or piping defining a gas flow path connected at one end to gas outlet 20 of adsorption bed A and connected at the opposite end to gas outlet 28 of adsorption bed B. A first flow control valve 50A is in the gas flow path between gas outlet 20 of adsorption bed A and adsorption bed B. Valve 50B allows unrestricted gas flow in a direction from the outlet 20 of bed A through the valve toward adsorption bed B, and the valve provides controlled flow therethrough in a direction to gas outlet 20 of adsorption bed A. The controlled flow preferably is provided by manual adjustment. A second flow control valve 50B is in the gas flow path between gas outlet 28 of adsorption bed B and the adsorption bed A. Valve 50B allows unrestricted gas flow therethrough in a direction from gas outlet 28 of adsorption bed B toward adsorption bed A, and it provides controlled flow therethrough in a direction to gas outlet 28 of adsorption bed B. The controlled flow preferably is provided by manual adjustment. Valves 50A, 50B preferably are identical and can be of the type known commercially as Parker-Hannifin flow control valves. An isolation valve in the form of an automatic valve 54 is provided in the gas flow path between gas outlets 20 and 28 of the adsorption beds, and in the system shown valve 54 is connected between gas outlet 20 of adsorption bed A and the flow control valve 50A.

The system of the present invention includes a second gas flow path provided by suitable conduits or piping which joins the gas outlets 20 and 28 of the adsorption beds A and B, respectively. A first automatic valve 60A is connected in the path adjacent outlet 20 of bed A, and a second automatic valve 60B is connected in the path adjacent outlet 28 of adsorption bed B. The segregated storage adsorption bed C is connected through an automatic valve 82 to a point in the gas flow path between the automatic valves 60A and 60B.

The system of the present invention further comprises a product outlet designated 66 and output conduit means for coupling the gas outlets of the adsorption beds to the product outlet 66. In the system shown the output conduit means is connected to the first flow path at a point between the flow control valves 50A and 50B and includes a first section 70 including an automatic valve 72 and a second section 74 including the series combination of a pressure regulator 76, a throttle valve 78 and a flow meter 80. The flow rate of product to the outlet 66 is controlled by valve 78 which preferably is a manually adjustable needle-type valve, and the flow rate is indicated visually by the meter 80.

The system of the present invention further comprises a reservoir 84 which functions primarily to store product gas received through a conduit 86 and serve as a reverse supply of product for use in the event of a system malfunction. A first reservoir conduit means is connected at one end of the system output conduit means and at the other end to the reservoir 84 through conduit 86 and includes flow control means in the form of check valve 90 which allows gas flow only in one direction from the system output conduit means to the reservoir 84. Another valve 92 in the form of a throttle valve which preferably is manually adjustable is connected in the conduit and preferably between check valve 90 and reservoir 84. Valve 92 can be used to control the rate of flow of gas product into reservoir 84. A second reservoir conduit means is connected at one end to reservoir 84 through conduit 86 and at the other end to the system conduit means and includes valve means 96 for controlling the flow of product gas from reservoir 84 to the output conduit means. A control 100 is connected by lines 102 and 103 to valves 72 and 96, respectively, and functions to open the normally closed valve 96 in response to closing of valve 72. A pressure indicator meter 104 can be connected to the output of reservoir 84 for the purpose of indicating the pressure of gas product remaining therein.

In general, the present invention is illustrated in terms of a process and system utilizing a first adsorption bed, a second adsorption bed and a segregated storage adsorption bed. However, the process and system can employ more than one first adsorption bed, more than one second adsorption bed and more than one segregated storage adsorption bed. The adsorption beds communicate with the feed gas stream which supplies the gaseous mixture, and the segregated storage adsorption bed never directly communicates with or is directly exposed to the feed gas stream.

Although the process and system of the present invention are described with particular reference to separation or fractionation of air to provide a high purity product oxygen by removal of nitrogen, essentially any gas mixture may be separated by the process and system of the present invention by the proper selection of time for each cycle and step and by the selection of a proper adsorbent material, adsorbent materials or mixtures of adsorbent materials.

As used herein, depressurizing or depressurization refers to the reduction of pressure in the vessel and associated piping of an adsorption bed and the level to which pressure is reduced can be selected by those skilled in the art depending upon operating conditions and the nature of the gas mixture being fractionated. Desorption and purging pressures are selected in a similar manner. Pressurizing or pressurization refers to the increase of pressure in the vessel and associated piping of an adsorption bed. The process and system of the present invention have the capability of product gas delivery in a low pressure range down to about 2 p.s.i.g. and in a high pressure range up to about 4 p.s.i.g. The present invention is not limited to particular pressures of the product gas or any other pressures, and one skilled in the art can manipulate and adjust pressures throughout the system to provide the desired delivery or product gas pressure. For example, when air is fractionated to deliver high purity oxygen gas product, a delivery pressure of around 3 p.s.i.g. is employed for medical uses and breathing devices whereas a higher delivery pressure of up to about 40 p.s.i.g. is ideally suited for commercial uses such as in metal cutting or welding equipment.

Figure 2:
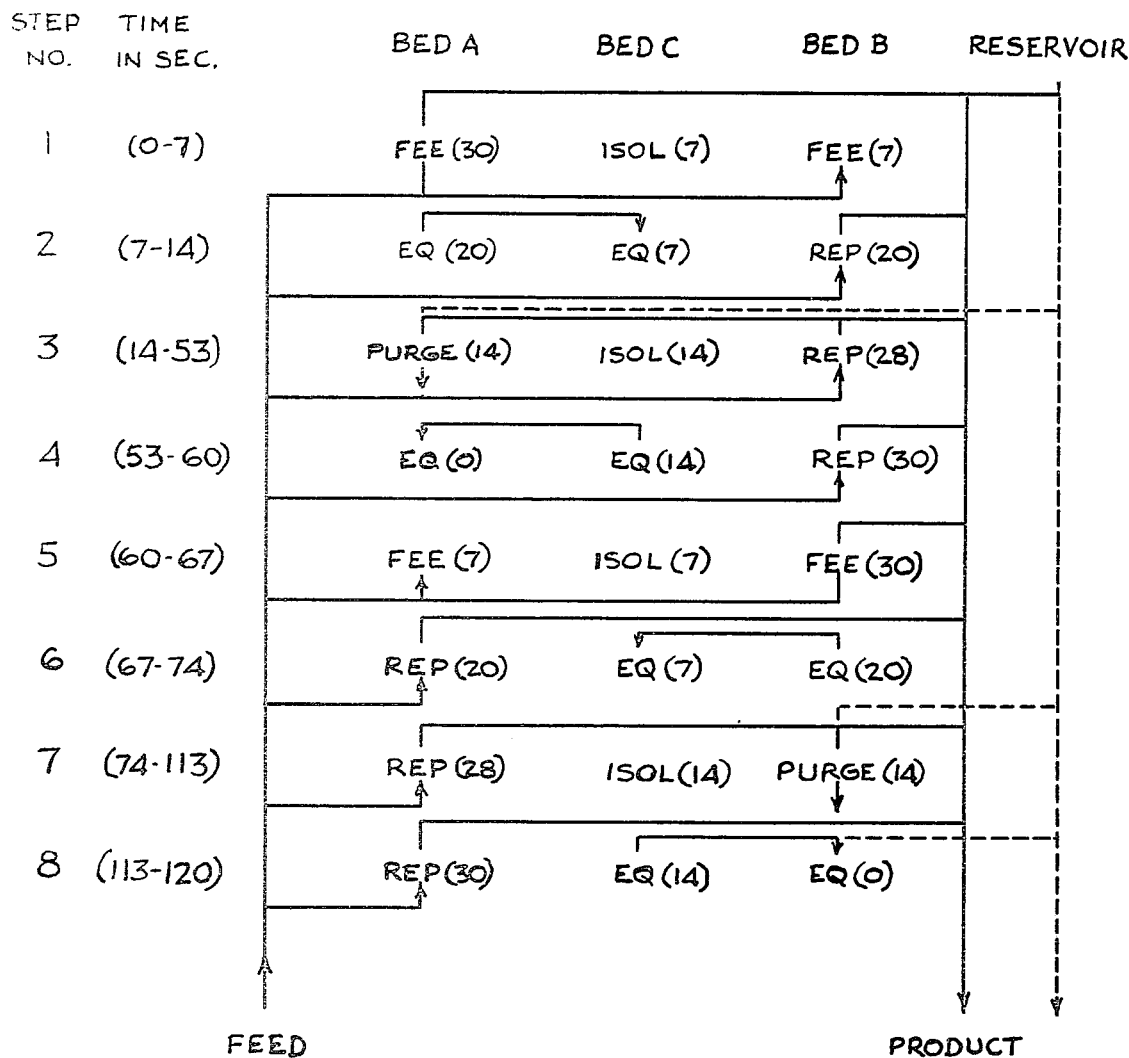
FIG. 2 is a cycle sequence chart illustrating the pressure swing adsorption process of the present invention.

FIG. 2 illustrates a process timing sequence according to the present invention for use with the system of FIG. 1. In FIG. 2 preferred times in seconds are indicated for each step, and preferred pressures in each adsorption bed for each step are shown parenthetically and given in pounds per square inch gage. The particular operation carried out in each adsorption bed during each step is shown in FIG. 2, most of which are abbreviated for convenience in illustration. Thus "FEE" refers to feed end equalization and will be explained in further detail presently, "ISOL" refers to isolation of a particular adsorption. "EQ" refers to pressure equalization of two adsorption beds and will be explained in further detail presently, "REP" refers to repressurization or repressurizing to increase the pressure in an adsorption bed, and "PURGE" refers to introduction of purge gas or purging.

Referring now in detail to FIG. 2, prior to step No. 1 the gaseous mixture i.e. ordinary air, has been flowing from the feed gas stream in conduit 10 and through valve 40A which is open into and through adsorption bed A wherein nitrogen is adsorbed. High purity oxygen gas leaves bed A through outlet 20 and flows through the opened valve 54 and flow control valve 50A and then flows along conduit section 70 through the opened valve 72, along conduit section 74 and through the series combination of pressure regulator 76, needle valve 78 and flow meter 80 to the product outlet 66 for use. Just prior to the beginning of step No. 1, adsorption bed A is about saturated and nearing the end of the adsorption operation therein. Also just prior to the beginning of step No. 1, adsorption bed A is at a higher pressure than the adsorption beds B and C.

At the beginning of step No. 1, valve 40B is opened, and valve 40A is kept open as well as valve 72. As indicated in FIG. 2, at the beginning of step No. 1, typical pressures in beds A, B and C are 30, 7 and 7, respectively.

During this step, gas flows from the bottom or feed end of adsorber A in a reverse direction through valve 40A whereupon it mixes with the incoming feed air stream from conduit 10 and flows through valve 40B into the bottom or feed end of adsorber B. Adsorption bed A is very near the end of the adsorption step therein, and the composition of this gas withdrawn from inlet 18 thereof is not appreciably different from the composition of air. As a result, during this step, adsorption bed A is depressurized countercurrently to feed flow, and adsorption bed A is pressure equalized with adsorption bed B causing the pressure in bed B to rise. Also in this step, adsorption bed A continues to supply oxygen gas product, but this is terminated by the end of the step. Step no. 1 preferably has a duration of about 7 seconds. Throughout this step and all other steps there is continuous air flow into the system and continuous product flow out. Cocurrent to feed flow is in a direction from the inlet to the outlet of the adsorption bed and countercurrent to feed flow is in a direction from the outlet to the inlet of the adsorption bed.

The process of step no. 1 may be described as continuing to discharge product gas from the outlet of the first bed while simultaneously equalizing the pressures of the first and second adsorption beds from the feed ends thereof by withdrawing gas from the feed inlet of the first adsorption bed at the end of the adsorption operation therein in a direction countercurrent to feed flow and introducing the withdrawn gas along with the gaseous mixture from feed gas stream to the feed inlet of the second adsorption bed in a direction cocurrent with feed flow and after pressurization thereof.

As shown in FIG. 2, at the transition between the end of step no. 1 and beginning of step no. 2, the pressures in beds A and B are equalized at 20 p.s.i.g. and the pressure in the segregated storage adsorption bed C has remained at 7 p.s.i.g. At the beginning of step no. 2, valve 40B remains open, valve 40A closes, and valve 60A opens. No product gas is obtained from adsorption bed A. During this step, feed air continues to flow into the feed inlet 26 of adsorber B, and oxygen rich gas is taken as product from the outlet 28 of adsorber B and flows through flow control valve 50B into conduit section 70 and through the remaining system components as previously described to product outlet 66. At the same time, low purity gas flows from the outlet 20 of adsorber A through valve 60A and valve 62 into the segregated storage adsorption bed C. As a result, during this step adsorption bed A is pressure equalized with the segregated storage adsorption bed C. The automatic valve 62 can remain open during all steps or it can be opened and closed when necessary. Step no. 2 preferably has a duration of about 7 seconds.

The process of step no. 2 may be described as simultaneously terminating the pressure equalization of step 1, adsorbing the gaseous mixture from the feed gas stream in the second adsorption bed, releasing product gas from the outlet of the second adsorption bed, and equalizing the pressures of the first adsorption bed and the segregated storage adsorption bed by withdrawing low purity gas from the outlet of the first adsorption bed in a direction cocurrent with feed flow and introducing the low purity gas into the segregated storage adsorption bed.

As shown in FIG. 2, at the transition between the end of step no. 2 and the beginning of step no. 3, the pressures in adsorption beds A and C are equalized at 14 p.s.i.g. and the pressure in adsorption bed B has risen to 28 p.s.i.g. At the beginning of step no. 3, valve 40B remains open, valve 60A closes and valve 46A opens. During this step feed air continues to enter bed B, and product quality oxygen rich gas continues to be taken as product from the outlet of bed B and is available at product outlet 66. Also during this step, adsorption bed A is depressurized to the atmosphere through valve 46A and waste outlet 44 in a direction countercurrent to feed flow. As a result, nitrogen rich waste gas is rejected to the atmosphere, and the pressure in adsorber A drops from 14 p.s.i.g. to 0 p.s.i.g. Concurrently with the foregoing depressurization, a portion of the oxygen gas product flowing from adsorber B through flow control valve 50B flows through valve 50A and valve 54 into adsorber A. The product quality oxygen gas flows through bed A and out through valve 46A and waste outlet 44 in a direction opposite to that of air separation. This oxygen purge flowing countercurrent to feed flow displaces nitrogen from the adsorbent material in bed A, and nitrogen rich stream leaves the system through valve 46A and outlet 44 to the atmosphere. As a result, product quality oxygen gas is taken from the adsorbing bed B to purge the nitrogen loaded bed A in a reverse direction to reject unwanted impurity to the atmosphere. Step no. 3 preferably has a duration of about 39 seconds.

The process of step no. 3 may be described as simultaneously terminating the pressure equalization of step 2, continuing adsorption of the gaseous mixture from feed gas stream in the second adsorption bed, releasing product gas from the outlet of the second adsorption bed, and depressurizing the first adsorption bed in a direction countercurrent to feed flow and purging the first adsorption bed by diverting some product gas from the outlet of the second adsorption bed into the first adsorption bed in a direction countercurrent to feed flow.

As shown in FIG. 2, at the transition between the end of step no. 3 and the beginning of step no. 4, the pressure in bed A is at 0 p.s.i.g., the pressure in segregated storage adsorption bed C has remained at 14 p.s.i.g., and the pressure in bed B has risen to 30 p.s.i.g. At the beginning of step no. 4, valve 40B remains open, valve 46A closes, and valve 60A opens. Valve 62 if not already open is opened at the beginning of this step. During this step feed air continues to enter bed B, and product quality oxygen gas continues to be taken as product from the outlet of bed B and is available at product outlet 66. At the same time, gas flows from the segregated storage tank C through valves 62 and 60A into adsorber A through the outlet 20 thereof. This gas withdrawn from adsorption bed C during step 4 is a version of the gas supplied to bed C during step 2 which gas has been influenced by travel in bed C.

As a result, during this step the segregated storage adsorption bed C is pressure equalized with the adsorption bed A. At least during the initial portion of step 4, there is some additional flow of gas from bed B through valves 50B, 50A and 54. At least during the initial portion of step no. 4, there is some additional flow of purge gas from bed B through valve 50B, 50A and 54. Step no. 4 preferably has a duration of about 7 seconds.

The process of step no. 4 may be described a simultaneously terminating the depressurizing and purging of the first adsorption bed, continuing adsorption of the gaseous mixture from the feed gas stream in the second adsorption bed, releasing product gas from the outlet of the second adsorption bed and equalizing the pressures of the segregated storage adsorption bed and the first adsorption bed by withdrawing gas from the segregated storage adsorption bed and introducing the withdrawn gas into the first adsorption bed in a direction countercurrent to feed flow.

The foregoing process steps are repeated consecutively beginning with pressure equalization of the adsorption beds from the feed ends thereof reversing the functions of the adsorption beds A and B. In particular, as shown in FIG. 2, at the transition between the end of step no. 4 and the beginning of step no. 5, the pressures in beds A and C are equalized at 7 p.s.i.g. and the pressure in bed B has remained at 30 p.s.i.g. At the beginning of step no. 5, valve 40B remains open, valve 60A closes and valve 40A opens. During this step, gas flows from the bottom or feed end of adsorber B, which is near the end of its adsorption operation, in a reverse direction through valve 40B whereupon it mixes with the incoming feed air stream from conduit 10 and the resulting mixture flows through valve 40A into the bottom or feed end of adsorber A. As a result, adsorption bed B is pressure equalized with adsorption bed A, and bed A begins to adsorb the feed gas mixture. This feed end equalization is similar to that which occurred during step no. 1 but in this step the roles of the beds A and B are interchanged. Also during this step, product quality oxygen rich gas continues to be taken as product from bed B and is available at product outlet 66. This step begins the second half of the process cycle wherein steps 5–8 are similar to 1–4 with the roles of beds A and B interchanged and with the valve sequence being the same with the A and B designations interchanged.

For example the process of step no. 6 (the same as step 2 with beds reversed) may be described as simultaneously terminating the pressure equalization of step no. 5, repressurizing the first adsorption bed while withdrawing product gas therefrom, and equalizing pressures in the second adsorption bed and the segregated storage adsorption zone.

Equalizing the pressures of the adsorption beds A and B at the feed ends thereof according to the present invention, as illustrated in step no. 1, advantageously reduces energy requirements and increases oxygen recovery. When an adsorption bed at the end of the adsorption step therein is depressurized countercurrently to feed flow, i.e. as bed A from 30 p.s.i.g. to 20 p.s.i.g. in step no. 1, the composition of the gas obtained from the bed inlet is not greatly different from air. Therefore this gas can be introduced into the feed end of a repressurizing adsorber, i.e. adsorption bed B in step no. 1, without any appreciable loss in system performance compared to repressurizing with air from the system compressor 12. Feed end equalization according to the present invention thus greatly reduces the feed air requirement and increases oxygen recovery, i.e. decreases the size of compressor 12 required to produce a given amount of oxygen. Feed end equalization recovers energy, increases system efficiency and can be used for both low and high product delivery pressures. The foregoing advantages of course apply to both of the feed end equalizations which occur during a single cycle as illustrated in step nos. 1 and 5.

The feed end equalization according to the present invention requires less adsorbent material in a given bed as compared to product end equalization for the following reasons. In product or outlet end equalization, the bed at the higher pressure depressurizes in a direction cocurrent to feed flow during the pressure equalization step. This causes the mass transfer zone to advance toward the product end of the bed as the pressure decreases. In order to contain the mass transfer zone during this step to maintain product purity, a larger bed, i.e. more adsorbent material, is required. In feed end equalization according to the present invention, on the other hand, the bed at the higher pressure depressurizes in a direction countercurrent to feed flow during the equalization step. In this step the mass transfer zone does not advance due to the direction of the gas flow. The countercurrent depressurization also is beneficial for the subsequent purge step because nitrogen starts to flow toward the feed end of the bed during this step. The combination of no advancing of the mass transfer zone and countercurrent depressurization reduces the amount of adsorbent material required.

Bed size factor is a quantity used to compare the amount of adsorbent material required from one system or cycle to another. At a given bed size factor, it has been determined that using feed end equalization according to the present invention produces oxygen at a higher purity as compared to using product end equalization.

The combination of equalizing pressures of an adsorption bed and the segregated storage adsorption bed when the adsorption bed is at the end of the adsorption operation therein and prior to purging of the bed as illustrated in step no. 2 and thereafter equalizing pressures between these same two components after purging of the adsorption bed when it is at a relatively low pressure as illustrated in step no. 4 maximizes the utilization of the adsorption bed while at the same time maximizing purity of the product. In particular, during step no. 2 as the depressurizing adsorber A equalizes cocurrently to feed flow into segregated storage adsorption bed C, part of the nitrogen contained in the mass transfer zone of bed A will be transferred into the bed C. This allows for maximum and continual utilization of adsorption bed A, i.e. the mass transfer zone can be moved along bed A from inlet to outlet as far as possible. At the beginning of the flow from bed A to bed C the gas is rich in oxygen but as flow continues the gas becomes more like air. In addition, the segregated storage adsorption bed C recovers some potential energy from the depressurizing adsorber and this, in turn, reduces system blowdown pressure and increases recovery and efficiency. Providing the segregated storage adsorption bed C in effect provides a mixing volume to smooth out any fluctuations in product purity which otherwise might occur when the front of the mass transfer zone breaks out of the output end of an adsorption bed. The foregoing advantages result when the system is operating at equilibrium conditions and at flow conditions for which the system is optimally designed. For example, when the system is used to supply oxygen for medical use, design conditions occur at a flow rate of about 3.0 liters per minute.

During step no. 4 as the segregated storage adsorption bed C pressure equalizes countercurrently to feed flow into adsorber A, the gas returned to adsorber A is distributed or dispersed therethrough in a manner which does not adversely affect product purity. The gas is not returned to adsorber A in a lump quantity concentrated in the output region of bed A but instead is spaced, equalized or dispersed through and along the bed A. The foregoing is believed to result from the fact that gas return to adsorber A occurs when the latter is at a relatively low pressure, i.e. 0 p.s.i.g. after purging of adsorber A, which low pressure allows the gas to disperse through the bed. It is believed that low or zero pressure in bed A allows the incoming gas to move along the bed in a manner such that a large amount of nitrogen is not taken up by the adsorbent material adjacent the outlet end of the bed. At the beginning of gas flow from bed C to bed A, the gas is rich in nitrogen but as the flow continues it becomes more rich in oxygen. The foregoing advantages are of course equally associated with the relationship between adsorption bed B and segregated storage adsorption bed C during step nos. 6 and 8.

Providing the flow control valves 50A and 50B allows the system to be balanced by providing individual control or adjustment of the purge gas flow to each of the adsorption beds A and B. Providing an adjustable flow control valve associated with each bed permits compensating for differences in the beds and piping by simple manual adjustment of valves 50A, 50B. An unbalanced system is characterized by the front of the mass transfer zone breaking through the output end of one bed sooner than in the other bed. In order to maintain purity, this would limit system operation to that of the bed which is first to experience nitrogen breakthrough thereby causing the other adsorber to be underutilized with the result that the entire system produces less oxygen at a given purity. System balance and optimization are achieved by the independently adjustable flow control valves 50A, 50B. Advantageously, product gas also travels through these same valves toward the system product outlet 66. Alternatively, flow control valves 50A and 50B could be replaced by two needle valves for independently controlling purge flow and then the combination of two check valves would be converted in parallel with the needle valves and oriented to transmit product gas from the bed outlets to the system product outlet 66.

The automatic valve 54 in the path containing valves 50A, 50B is a shut down isolation valve which serves to isolate beds A and B when the system is shut down to maintain the respective pressures in the beds and prevent pressure equalization. When the system is shut down, all the other automatic valves close also. Then when the system is placed in operation, less time is required to reach desired operating conditions by virtue of the beds A and B having been maintained at the respective pressures prior to shut down.

Table I presents data illustrating the effect of the segregated storage tank or segregated storage adsorption bed C on system performance. The data presented in Table I is for oxygen product at a purity of 90% and the oxygen recovery in percent is presented for both low pressure and high pressure delivery conditions. The abbreviations S.S.T. for segregated storage tank and F.E.E. for feed end equalization are used.

TABLE I

|  | Low Pressure Delivery | High Pressure Delivery |
|---|---|---|
| S.S.T. Absent | 21% | 21% |
| S.S.T. Present But Empty | 25% | 23% |
| S.S.T. Half Full Of Adsorbent Material | 35% | 31% |
| S.S.T. Full And With F.E.E. | 49% | 48% |

Figure 3:
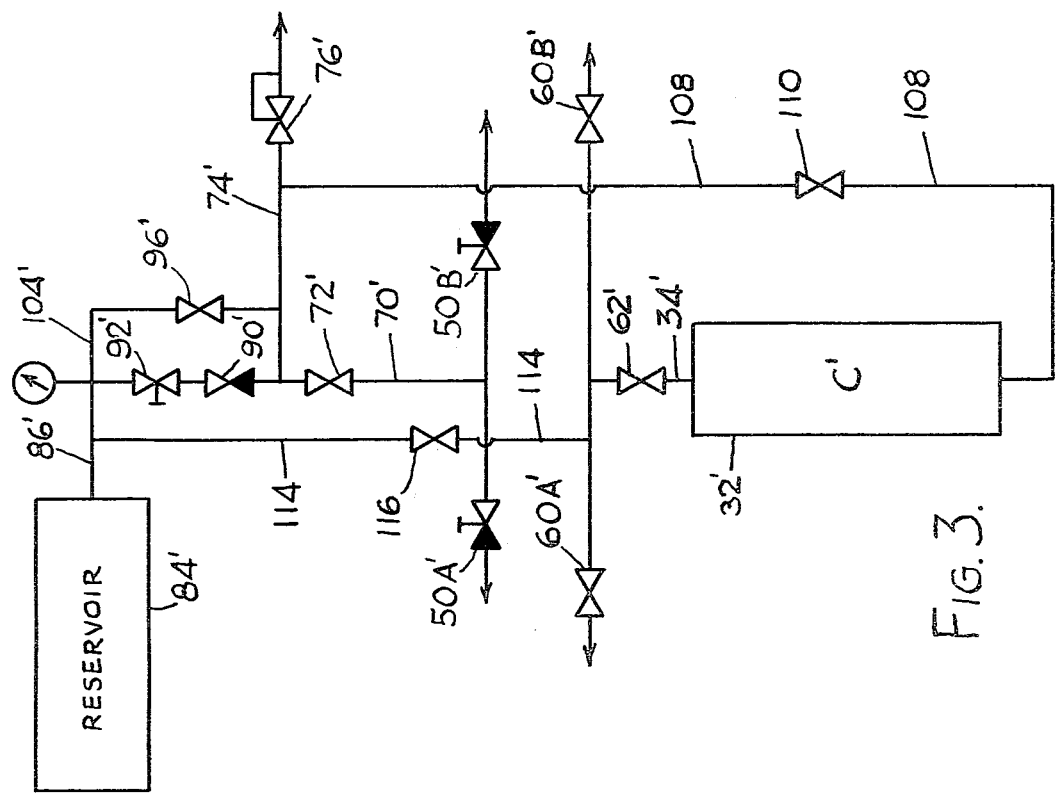
FIG. 3 is a schematic diagram of a pressure swing adsorption system with parts removed according to another embodiment of the present invention.

FIG. 3 shows a system according to another embodiment of the present invention wherein gas product can be withdrawn from the other end of the segregated storage adsorption bed. In the system shown in FIG. 3, components identical to those of FIG. 1 are provided with the same reference numerals but with a prime designation. In addition, the system of FIG. 3 would also include adsorption beds identical to those designated A and B in the system of FIG. 1, along with similar connections of the feed gas stream to the gas inlets of the beds, connections of the gas inlets to the waste outlet, and connections of the gas outlets of the beds to the gas flow path containing the flow control valves 50A' and 50B'. Thus, the arrowheads at opposite ends of the path shown in FIG. 3 containing automatic valves 60A', 60B' and the path containing flow control valves 50A' and 50B' indicate connection to the gas outlets of the corresponding adsorption beds A and B. Similarly, the output of regulator 76' is connected through a throttle valve and flow indicator to a product outlet as indicated by the arrowhead in the portion 74' of the gas flow path.

The opposite end of the segregated storage adsorption bed C' is connected by a conduit 108 which contains an automatic valve 110 to the output conduit means, in particular to portion 74' thereof and upstream from regulator 76'. Upon opening of valve 110, product quality gas can be withdrawn from the segregated storage adsorption bed C' and introduced to the output conduit means. Withdrawing product gas from the segregated storage adsorption bed can be advantageous in situations where low pressure rather than high pressure product delivery is needed. In addition, when product is delivered from the segregated storage adsorption bed C', the bed serves also as a product surge tank enabling product to be withdrawn from the system at a high flow rate for a short period of time before the mass transfer zone breaks through that end of the bed. On the other hand, recovery from a breakthrough condition can be relatively slow. Another advantage of withdrawing product gas from the segregated storage adsorption bed C' is that it provides a relatively higher rate of recovery of product. This is because withdrawal of product from bed C' reduces the pressure therein so that when the pressure equalizes with either of the adsorption beds that adsorption bed, in time, will be at a lower pressure. The lower pressure, in turn, imposes a lower blowdown requirement for that bed with a result that less gas is released to the atmosphere. This reduction in the waste losses, in time, results in a higher percentage of product recovery. Another advantage associated with the segregated storage adsorption bed involves feed end equalization which lowers the front of the mass transfer zone in each of the other two beds so that when the beds are equalized from the tops with the segregated storage adsorption bed there is less nitrogen to be taken up by the segregated storage adsorption bed.

As shown in FIG. 3, the system can also include a third reservoir conduit designated 114 connected at one end to the reservoir 84' and coupled at the other end to the adsorption beds. In the present illustration, the other end of conduit 114 is connected to the flow path containing the automatic valves 60A' and 60B' and is connected between these valves. Conduit 114 contains an automatic valve 116. Upon opening of valve 116, product gas from reservoir 84' flows to the adsorption beds and it can be used for operations such as purging and repressurization.

The primary role of the reservoir in the system of the present invention is a reserve supply of product gas in the event of equipment malfunction or power failure. This is of particular importance when the system of the present invention supplies oxygen for medical use. Under normal operating conditions the reservoir is at a pressure of 28-29 p.s.i.g., and product oxygen flows through valve 72 and regulator 76 to product outlet 66. If electrical power is interrupted, valve 72 closes and this is sensed by control 100 which opens valve 96. Oxygen flow continues from the reservoir through valve 96 to the output conduit to outlet 66 until the supply in the reservoir is depleted. An alarm can be sounded to indicate the power interruption.

The reservoir also can be used to supply part or all of the purge oxygen required for an adsorber during its purge step. This is accomplished by opening valve 116 at the appropriate time. The reservoir also can be used as another surge tank. Pressure equalizations to and from the adsorbers can be accomplished through the correct sequencing of valves 116 and 62.

The primary purpose of the reservoir is a reserve oxygen supply in the event of a malfunction. The length of time the reserve oxygen lasts depends on the pressure in the reservoir at the time of the malfunction. If the reservoir is used only as a back-up oxygen supply, the reservoir pressure will be at its maximum at all times. If the reservoir is used to supply supplemental purge and or repressurization gas, the pressure in the reservoir will vary as will the reserve supply of oxygen. The reservoir can comprise an adsorption bed but it also can comprise and ordinary tank of larger size.

Figure 4:
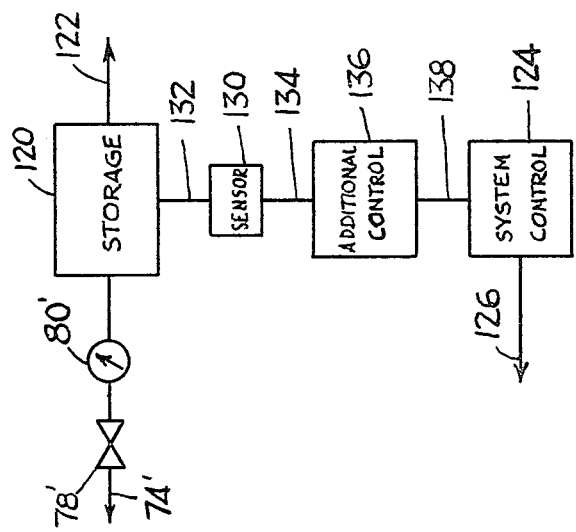
FIG. 4 is a schematic block diagram of a control arrangement according to the present invention for a pressure swing adsorption system.

FIG. 4 shows an arrangement for controlling the system and process of the present invention. The output conduit means can be connected to a tank or similar storage receptacle or vessel 120 and gas product can be withdrawn therefrom through a conduit or path 122 for use. The sequencing and timing of the system including the control of the automatic valves is performed by a system control designated 124, and control signals or commands generated by the control 124 are transmitted by lines collectively designated 126 to the valves and other appropriate components of the system. Persons skilled in the art are readily familiar with such controls so that a detailed description thereof is believed to be unnecessary. Generally, the control 124 is responsive to the pressure of product gas within the storage element 120, and to this end a pressure sensor 130 is operatively connected to the storage element 120 by the connection designated 132. In accordance with the present invention, the output from sensor 130 is connected by a line 134 to an additional control means 136 which, in turn, is connected in controlling relation to the system control 124 by the connection designated 138. In accordance with the present invention, it has been determined that once operation of the process and system has begun there is an optimum time at which to terminate operation, both in terms of a minimum number of cycles to be completed and a point within a cycle to terminate operation. The additional control functions to cause the system control 124 to maintain operation of the system, once begun, for a predetermined number of cycles. It has been determined that in a system of the present invention for producing oxygen from feed air that a total of two complete cycles provides desirable results. One complete cycle includes step nos. 1–8 described in FIG. 2. Furthermore, it has been determined that there is an optimum point within a cycle at which operation of the system and process should be terminated. This is when the pressures are equal in the two adsorption beds A and B which is at the beginning of step nos. 2 and 6 described in FIG. 2. Thus, the additional control 136 also functions to stop the system only after two complete cycles have been completed and only at an optimum point within the next cycle when the pressures are equal in the two adsorption beds A and B. The additional control can be of the cam type or step switch type, for example, and persons skilled in the art are readily familiar with the construction and operation of these and other types which can be used for additional control 124 so that a detailed description thereof is believed to be unnecessary. Thus, the system control means 124 is responsive to gas pressure in storage means 120 signalled by sensing means 130 for stopping operation of the process and system normally when gas pressure in storage means 120 reaches a predetermined magnitude. The additional control means 136 overrides the system control means to terminate operation of the process and system only at a predetermined time.

It is therefore apparent that the present invention accomplishes its intended objects. While several embodiments of the present invention have been described in detail, this is for the purpose of illustration, not limitation.

We claim:

1. In a pressure swing process for fractionating at least one component from a gaseous mixture by selective adsorption in each of at least two adsorption zones by sequentially passing the gaseous mixture from a feed stream through a first adsorption zone until the zone is about saturated while simultaneously purging and then pressurizing a second adsorption zone and then passing the gaseous mixture from the feed stream through the second adsorption zone until the zone is about saturated while simultaneously purging and then pressurizing the first adsorption zone, the improvement comprising:
  (a) withdrawing low purity gas from one of the adsorption zones in a direction cocurrent with feed flow when the zone is at the end of the adsorption operation therein and prior to purging of the zone until the mass transfer zone moves out of said adsorption zone;
  (b) introducing the withdrawn low purity gas and said mass transfer zone to one end of a segregated storage adsorption zone; and
  (c) withdrawing gas from said one end of the segregated storage adsorption zone and passing said withdrawn gas and said mass transfer zone into said one adsorption zone in a direction countercurrent to feed flow after purging of the zone and when the zone is at a relatively low pressure.

2. The improved process according to claim 1 further including withdrawing product gas from the other end of said segregated storage adsorption zone.

3. In a pressure swing process for fractionating at least one component from a gaseous mixture by selective adsorption in each of at least two adsorption zones by sequentially passing the gaseous mixture from a feed stream through a first adsorption zone until the zone is about saturated while simultaneously purging and then pressurizing a second adsorption zone and then passing the gaseous mixture from the feed stream through the second adsorption zone until the zone is about saturated while simultaneously purging and then pressurizing the first adsorption zone, the improvement comprising withdrawing gas from one of said adsorption zones at the end of the adsorption operation therein in a direction countercurrent to feed flow and introducing the withdrawn gas along with the gaseous mixture from the feed stream into the other of said adsorption zones in a direction cocurrent with feed flow and after pressurization thereof to equalize the pressures in said adsorption zones from the feed ends thereof.

4. A pressure swing process for fractionating at least one component from a gaseous mixture by selective adsorption in each of at least two adsorption zones comprising the steps of:
  (a) providing a first adsorption bed having a gas inlet and a gas outlet, at least one additional adsorption bed having a gas inlet and a gas outlet, the gas inlets of said first and additional adsorption beds being selectively connected to a feed gas stream, and a segregated storage adsorption bed isolated from direct communication with the feed gas stream;
  (b) withdrawing gas from said first adsorption bed at the end of the adsorption operation therein in a direction countercurrent to feed flow and introducing the withdrawn gas along with the gaseous mixture from the feed gas stream into said additional adsorption bed in a direction cocurrent with feed flow and after pressurization thereof to equalize the pressures in said adsorption beds from the feed ends thereof;
  (c) terminating said pressure equalization of said beds from the feed ends thereof and simultaneously adsorbing the gaseous mixture from the feed gas stream in said additional adsorption bed, releasing product gas from the outlet of said additional adsorption bed and equalizing the pressures of said first adsorption bed and said segregated storage adsorption bed by withdrawing low purity gas including the mass transfer zone in said first bed from said first adsorption bed in a direction cocurrent with feed flow and introducing said low purity gas and said mass transfer zone into one end of said segregated storage adsorption bed;
  (d) terminating said pressure equalization of said first and segregated storage adsorption beds and simultaneously adsorbing the gaseous mixture from the feed gas stream in said additional adsorption bed, and depressurizing said first adsorption bed in a direction countercurrent to feed flow and purging said first adsorption bed by diverting product gas from the outlet of said additional adsorption bed into said first adsorption bed in a direction countercurrent to feed flow;
  (e) terminating said depressurizing and purging of said first adsorption bed and simultaneously adsorbing the gaseous mixture from the feed gas stream in said additional adsorption bed, releasing product gas from the outlet of said additional adsorption bed and equalizing the pressures of said segregated storage adsorption bed and said first adsorption bed by withdrawing gas from said one end of said segregated storage adsorption bed and introducing the withdrawn gas and said mass transfer zone into said first adsorption bed in a direction countercurrent to feed flow; and (f) thereafter consecutively repeating said steps beginning with pressure equalization of said beds from the feed ends thereof reversing the functions of said first adsorption bed and said additional adsorption bed.

5. The process according to claim 4, wherein the gaseous mixture is air and the product gas is high purity oxygen.

6. The process according to claim 4, further including controlling said process steps in a manner such that said process is continued for a predetermined number of cycles.

7. The process according to claim 4, further including controlling said process steps in a manner such that said process is terminated after two complete cycles.

8. In a system for fractionating at least one component from a gaseous mixture by pressure swing adsorption including a first adsorption bed having a gas inlet and a gas outlet at least one additional adsorption bed having a gas inlet and a gas outlet, means for connecting said gas inlets of said adsorption beds to a feed gas stream, a product outlet, and means for coupling said gas outlets of said adsorption beds to said product outlet, the improvement comprising:

(a) means defining a gas flow path connected at one end to said gas outlet of said first adsorption bed and at the opposite end to said gas outlet of said additional adsorption bed;

(b) a first flow control valve in said gas flow path between said gas outlet of said first adsorption bed and said additional adsorption bed, said valve automatically allowing unrestricted gas flow in a direction from said outlet of said first bed toward said additional adsorption bed and controlled flow in a direction to said gas outlet of said first bed; and (c) a second flow control valve in said gas flow path between said gas outlet of said additional adsorption bed and said first adsorption bed, said valve automatically allowing unrestricted gas flow in a direction from said outlet of said additional bed toward said first adsorption bed and controlled flow in a direction to said gas outlet of said additional bed.

9. The improved system according to claim 8 further including isolation valve means in said gas flow path between said gas outlets of said adsorption beds.

10. The improved system according to claim 8 wherein said product outlet coupling means is connected to said gas flow path between said first and second flow control valves.

11. In a system for fractionating at least one component from a gaseous mixture by pressure swing adsorption including a first adsorption bed having a gas inlet and a gas outlet, at least one additional adsorption bed having a gas inlet and a gas outlet, means for connecting said gas inlets of said adsorption beds to a feed gas stream, a product outlet and output conduit means for coupling said gas outlets of said adsorption beds to said product outlet, the improvement comprising:

(a) a reservoir;

(b) first reservoir conduit means connected to said output conduit means and to said reservoir, said first conduit means including flow control means allowing gas flow only in one direction from said output conduit means to said reservoir; and (c) second reservoir conduit means connected to said reservoir and to said output conduit means, said second conduit means including valve means for totally controlling flow of product gas from said reservoir to said output conduit.

12. The improved system according to claim 11 further including valve means in said output conduit between said second reservoir conduit and said adsorption beds and control means operatively connected to said reservoir conduit valve means and to said output conduit valve means for opening said reservoir valve means in response to closure of said output valve means for supplying product gas from said reservoir to said product outlet.

13. The improved system according to claim 11 further including third reservoir conduit means connected at one end to said reservoir and coupled at the other end to said adsorption beds, said third conduit means including flow control means for controlling flow of product gas from said reservoir to said adsorption beds for operations such as purging and repressurization.

14. In a system for fractionating at least one component from a gaseous mixture by pressure swing adsorption including a first adsorption bed having a gas inlet and a gas outlet, at least one additional adsorption bed having a gas inlet and a gas outlet, means for connecting said gas inlets of said adsorption beds to a feed gas stream, a product outlet, means for coupling said gas outlets of said adsorption beds to said product outlet, and system control means for controlling system operation including sequentially passing the gaseous mixture from a feed stream through said first adsorption bed until said bed is about saturated while simultaneously purging and then pressurizing said additional adsorption bed and then passing the gaseous mixture from the feed stream through said additional adsorption bed until said bed is about saturated while simultaneously purging and then pressurizing said first adsorption bed, the improvement comprising: additional control means operatively connected to said system control means for causing said system control means to maintain operation of said system for a predetermined number of cycles.

15. The improved system according to claim 14 wherein said additional control means causes said system control means to maintain operation of said system for at least two complete cycles.

16. The improved system according to claim 14 wherein said additional control means causes said system control means to terminate operation of said system only after at least two complete cycles.

17. The improved system according to claim 14 wherein said additional control means causes said system control means to terminate operation of said system only when the pressures in said adsorption beds are substantially equal.

18. The improved system according to claim 14 further including gas product storage means connected to said product outlet and pressure sensing means operatively associated with said storage means, said system control means being responsive to gas pressure in said storage means signalled by said sensing means for stopping operation of said system normally when gas pressure in said storage means reaches a predetermined magnitude, said additional control means being operatively connected to said pressure sensing means and connected in controlling relation to said system control means for overriding said system control means to terminate operation of said system only at a predetermined time.

19. A pressure swing adsorption system for fractionating at least one component from a gaseous mixture by selective adsorption in at least two adsorption zones comprising:

(a) a first adsorption bed having a gas inlet and a gas outlet and at least one additional adsorption bed having a gas inlet and a gas outlet;

(b) means for connecting said gas inlets of said adsorption beds selectively to a feed gas stream;

(c) means defining a gas flow path connected at opposite ends to said gas outlets of said adsorption beds, a first flow control valve in said path adjacent said outlet of said first adsorption bed and automatically allowing unrestricted flow from said bed through said valve and controlled flow through said valve toward said bed, and a second flow control valve in said path adjacent said outlet of said additional adsorption bed and automatically allowing unrestricted flow from said additional bed through said valve and controlled flow through said valve toward said bed;

(d) output conduit means having a gas product outlet at one end and coupled at the other end to said gas outlets of said adsorption beds; and (e) a reservoir, first conduit means connected to said output conduit means and including flow control means allowing gas flow only in a direction from said output conduit means into said reservoir, and second conduit means connected to said reservoir and to said output conduit means adjacent said gas product outlet and including flow control means for controlling gas flow from said reservoir to said gas product outlet through said output conduit means.

* * * * *